United States Patent [19]

Null

[11] 4,264,338
[45] Apr. 28, 1981

[54] METHOD FOR SEPARATING GASES

[75] Inventor: Harold R. Null, St. Louis, Mo.

[73] Assignee: Monsanto Company, St. Louis, Mo.

[21] Appl. No.: 67,078

[22] Filed: Aug. 16, 1979

Related U.S. Application Data

[63] Continuation-in-part of Ser. No. 847,972, Nov. 2, 1977, abandoned.

[51] Int. Cl.³ .............................................. B01D 59/12
[52] U.S. Cl. ............................................ 55/16; 55/158
[58] Field of Search .............................. 55/16, 158, 66; 210/23 H, 22, 23 F, 321 R, 433 M

[56] References Cited

U.S. PATENT DOCUMENTS

| | | |
|---|---|---|
| 3,208,197 | 9/1965 | Simon et al. .............................. 55/16 |
| 3,442,002 | 5/1969 | Geary, Jr. et al. ................. 55/158 X |
| 3,713,271 | 1/1973 | Franz et al. .............................. 55/16 |
| 3,792,570 | 2/1974 | Biondi et al. ............................ 55/16 |
| 3,836,457 | 9/1974 | Gross et al. ......................... 210/23 H |
| 3,961,917 | 6/1976 | Benedict et al. ........................ 55/16 |
| 4,000,065 | 12/1976 | Ladha et al. ...................... 210/23 H |
| 4,119,417 | 10/1978 | Heki et al. ............................. 55/158 |

Primary Examiner—Robert H. Spitzer
Attorney, Agent, or Firm—L. R. Hattan; T. B. Leslie

[57] ABSTRACT

An improved process for the separation of gases by selective membrane diffusion or permeation by means of plural stages of membrane separation without increasing the work required by directing a permeant mixture from a second or later stage of separation to a recycle stage of membrane separation to provide a permeate enriched in the desired gas or gases and blending said permeate with the gaseous feed to said second or later stage of separation.

20 Claims, 3 Drawing Figures

METHOD FOR SEPARATING GASES

This application is a continuation-in-part of copending application Ser. No. 847,972 filed Nov. 2, 1977 now abandoned.

This invention relates to the method of separating gases by means of membranes selective for the permeation of one or more gases of a mixture of gases. More particularly, the invention relates to a method for the selective membrane separation of gases by gaseous diffusion or permeation wherein the separating efficiency of the gaseous separating membrane stages are improved without increasing the work required to accomplish the separation or altering the characteristics of the membranes employed.

Gas separation membranes have been developed in recent years for separating many gases from mixtures thereof with many other gases and vapors. The separation of gases with membranes, whether by diffusion or permeation through the material of the membrane, depends to a large extent on the differential pressures maintained on either side of the membrane. The pressure considerations differ considerably from those required when liquid materials are to be separated by means of semi-permeable membranes.

Generally the flux of one or more gases through a semi-permeable membrane is enhanced as the pressure differential on the two sides of the membrane is increased. However, practical limits to such increased pressures are always imposed, generally by the strength of the membranes employed, whether in flat film or hollow fiber form. In addition, the cost of compressing gases and gaseous mixtures through repeated stages of separation such as cascaded separation steps or stages rapidly becomes economically limiting.

A method to separate such gases or gaseous mixtures to a high degree of purity which does not require large increases in work necessary for compression would be advantageous and desirable.

There has been discovered a method for separating gases which increases the purity or concentration of the product gas or gases that does not require large increases in compressor work required. This novel method is applicable to any separation of gaseous mixtures which are separable by permeation or diffusion through membranes, but in which a single stage will not produce the desired purity of permeated product gas or gases. Thus the method is applicable to any multi-stage or cascade gas separation system, i.e. a system wherein concentration of the permeated gas or gases is accomplished in a series of connected permeation stages, as an additional stage or stages of such system.

The novel method of the present invention involves the steps of providing an initial gaseous mixture at an elevated or superatmospheric pressure and contacting said pressurized mixture with a first stage membrane permeable to at least one of the gases in said mixture to provide a first stage permeate mixture, compressing said first stage permeate mixture and contacting same with a second stage membrane permeable to said at least one of the gases in the first permeate mixture to provide a second permeate mixture and a depleted second permeant mixture, directing said second permeant mixture to contact a recycle stage membrane permeable to said at least one of the gases in said permeant mixture to produce a recycle permeate mixture and a recycle permeant mixture, blending said recycle permeate mixture with said first stage permeate mixture prior to compression thereof, blending said recycle permeant mixture with said pressurized initial gaseous mixture, and recovering said second permeate mixture.

In order to provide a clearer understanding of the present invention, reference is made to the preferred embodiments exemplary of the invention shown in the accompanying drawing.

Figure 1:
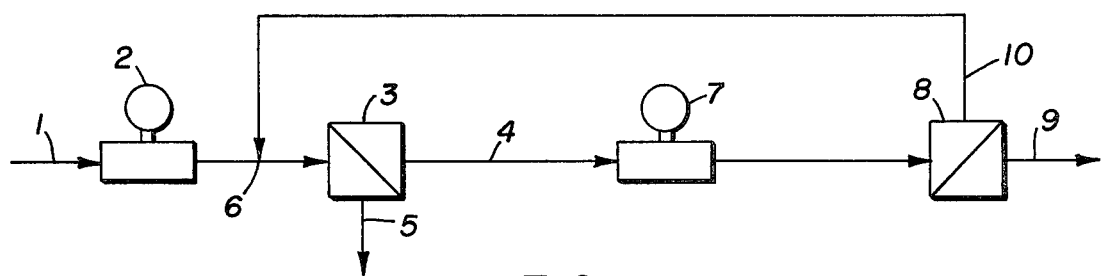
FIG. 1 is a schematic diagram showing the prior art method of separating one or more gases from mixtures thereof with other gases utilizing two stages of membrane separation and concentration.

FIG. 1 illustrates a typical two stage gas separation system of the prior art in which the gas or mixture of gases preferentially permeated by the first stage membrane separation is further concentrated by second stage membrane separation. In operation the gaseous feed mixture 1 is supplied at a desired elevated pressure such as by the compression to desired pressure by compressor 2 and passed to a first stage membrane apparatus 3. In many applications of multistage or cascade separation and concentration of gases by permeation the gas mixtures to be treated are available at elevated pressures and an initial compression step, as by compressor 2, is not required. Such gas mixtures at superatmospheric pressures may be supplied from chemical or refinery processes, from pressurized storage vessels, from gas wells or pipelines or from any other source under suitable pressure. From the first stage membrane apparatus 3 there is produced a permeate mixture 4 enriched in the gas or gases desired to be concentrated and a permeant, or unpermeated residue, mixture 5 depleted in the desired gas or gases which can be vented, burned for fuel, or otherwise disposed of depending upon its composition.

The enriched permeate mixture is compressed or recompressed by compressor 7 and passed to a second stage membrane apparatus 8. From the second stage membrane apparatus 8 there is produced a further enriched or concentrated second permeate mixture 9 and a second stage permeant mixture 10 depleted in the desired gas or gases. This second permeant mixture 10 can be recycled to blend with the feed mixture at point 6 after compressor 2, if present, or it can be disposed of as desired. The second stage concentrate or permeate 9 generally constitutes the desired product, a concentrated gas or mixture of gases.

Such a gas separation cascade is limited in the degree of concentration or purification which can be obtained by the permeabilities to the desired gas or gases of the membranes employed in each of the stages, the selectivities or separation factors of these membranes for the desired gases as compared to the other gases present in the gaseous feed mixtures and the ability of the membranes to withstand the pressure differentials imposed thereon. Consequently desirable gas separations either do not reach the concentrations or purities desired or require additional stages of separation which entail added steps of compression and membrane separation with resulting increases in equipment required and severely increased costs. In many such instances the costs are not economically feasible in comparison to other available means of separating, concentrating or purifying the desired gas or gases and consequently membrane separation means are not employed.

Figure 2:
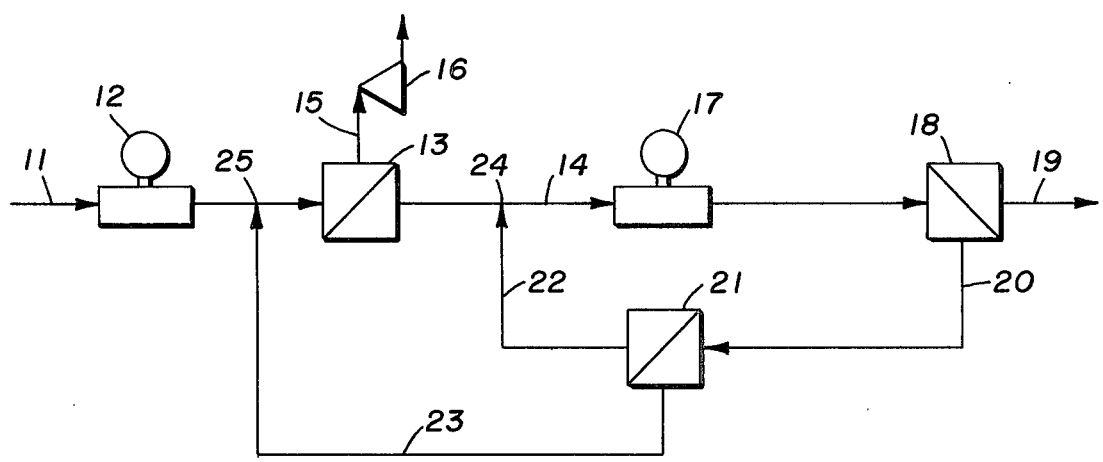
FIG. 2 is a schematic drawing of the separation of such gases from mixtures thereof by membrane permeation using one embodiment of a two stage separation and recycle method of this invention.

Referring now to FIG. 2, which shows one embodiment of the present invention, the improved operation and result are illustrated.

In the operation of this embodiment the gaseous feed mixture 11 is supplied at an elevated pressure, such as by compressor 12, separated in first stage membrane apparatus 13 into a first stage permeant mixture 15 and enriched permeate mixture 14 which is compressed or recompressed by compressor 17 and passed to the second stage membrane apparatus 18, as previously described. The second stage permeant mixture 20, however, is passed to a third or recycle stage of membrane separation apparatus 21 to achieve improved efficiency. The recycle stage 21 requires no additional compression or increase in pressure since the second stage permeant mixture 20 is at substantially the same pressure as the feed mixture to the second stage membrane apparatus 18, having undergone only the minimum pressure drop occasioned by passage along the permeant side of membrane apparatus 18 and any line pressure drop incidental to passage from separator 18 to 21. The recycle stage membrane apparatus 21 produces an enriched permeate mixture 22 suitable for blending with the permeate mixture 14 from the first separation stage to afford additional enriched feed mixture to the second separation stage. Such blending is carried out by introducing the recycle stage permeate mixture 22 into the conduit for first stage permeate mixture 14 at a point 24 between said first stage membrane apparatus 13 and the compressor 17 for the second separation stage. There is simultaneously produced a recycle stage permeant mixture 23 suitable for blending with the pressurized gaseous feed mixture 11 at a point 25 prior to the inlet to the first stage separation membrane apparatus 13. Sizing the recycle stage membrane area to produce a recycle stage permeant mixture 23 of approximately the same composition as the feed mixture 11 generally serves to minimize the energy or work required for compression. If the recycle stage permeate mixture 22 represents a substantially larger volume of gases than the permeant mixture 23, it will sometimes be desirable to size the recycle stage membrane area to produce a permeate mixture of approximately the same gas composition as the first stage permeate mixture 14 in order to minimize compression. Furthermore, since the recycle stage permeant mixture 23 will be at substantially the same pressure as the feed mixture to the first stage separation apparatus 13 when the first and second stages of membrane separation are conducted at approximately the same pressure, total compression requirements for the process are kept to a minimum.

The advantages of such a staged cascade and recycle gas separation are several. An increase in the separation efficiency is realized by producing a product gas mixture 19 of a higher concentration of the desired gas or gases, i.e. a higher degree of purity.

Such increase is realized without any additional input of energy or work in the form of compression. It is achieved without altering the gas separation characteristics of the membranes used or requiring the use of a membrane differing in such characteristics from those used previously in multistage gas separation cascades. It is applicable for the improved separation of all gases or mixtures of gases separable by permeation through any given membranes and with those same membranes, requiring no alteration of such membranes or their characteristics.

It has been found by computer simulated studies, for instance, that a two stage cascade and recycle gas separation process for oxygen from air feed as shown in FIG. 2 operated at the same pressure differential in both separation stages and employing hollow fiber membranes of the same separation factor and permeability for oxygen in relation to nitrogen as those in the process of FIG. 1, can raise the concentration of oxygen in the second stage permeated mixture product, at the same weight of gas per hour, from 81.2% by volume to 90.3% by volume with no increase in the horsepower required for two stages of compression compared to the two-stage cascade gas separation process illustrated in FIG. 1. Furthermore, the improvement in efficiency is realized in this instance with the use of a lower total separation membrane area of the same membranes as in the two-stage process with which it is compared, i.e. the total surface area of three items of separation membrane apparatus in the process of FIG. 2 is 57.7 M ft.$^2$ (5360 sq. meters) compared to a total membrane surface area of two items of separation membrane apparatus of 76.6 M ft.$^2$ (7116 sq. meters) employed in the two-stage process.

Improved efficiencies are also realized when employing the novel features of the present invention in other multi-stage cascade gas separation processes for concentration of gases by permeation such as those employing 3, 4 or more stages of membrane separation and concentration in series. When employing the improved process of the present invention with such multiple stage cascade systems, the novel recycle stage membrane separation can be associated with any two successive stages of separation to afford improved efficiency. Thus, in an n-stage cascade system, n-1 recycle stages can be employed, if desired. However, to minimize equipment addition, it is generally preferred to employ the novel recycle stage for the permeant mixture from the final separation stage in a series to provide a recycled permeate mixture to be blended with the enriched permeate mixture from the penultimate stage, i.e. the stage prior to the final stage of separation and a recycle stage permeant mixture to be blended with the enriched pressurized feed stream to the penultimate stage of membrane separation. Such an improved multi-stage gas separation cascade process is illustrated in FIG. 3 and further described hereinafter.

Figure 3:
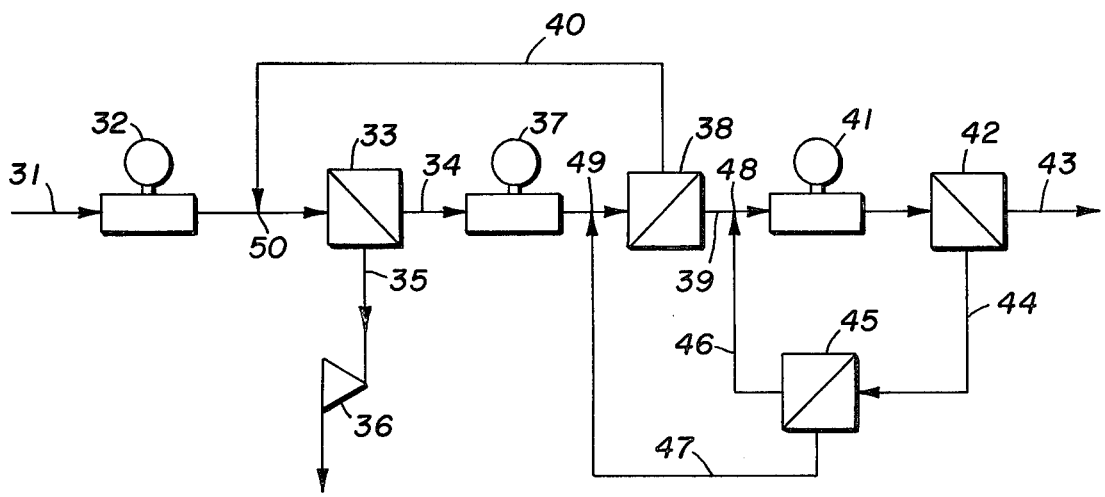
FIG. 3 is a schematic diagram showing another embodiment of a multi-stage method for separating and concentrating said gases by membrane permeation which employs a recycle stage to realize a high degree of purity of the desired gas or gases.

In the operation of the embodiment as shown in FIG. 3 the gaseous feed mixture 31 is supplied at elevated pressure, such as by compressor 32, and separated in the first stage membrane apparatus 33 to produce an enriched first stage permeate mixture 34 and a depleted first stage permeant mixture 35. As shown in FIG. 3 the first stage permeant mixture 35, depleted in the gas or gases to be concentrated, can be directed, if desired, prior to disposal to a pressure reducer or expander 36 for power recovery from such pressurized permeant mixture and application of such recovered energy by conventional means to perform useful work in the present or any desired process. Likewise, such power recovery, if desired, can be carried out on the pressurized permeant mixture 15 from the first stage of the two-stage process as illustrated in FIG. 2 by the pressure reducer or expander 16. The enriched permeate mixture 34 from stage 1 is compressed, or recompressed, by compressor 37 and passed to the second stage membrane apparatus 38 which produces a stage 2 permeant mixture 40 suitable for recycle to the pressurized stage 1 feed mixture 31 at a point 50 prior to the inlet of said stage 1 apparatus 33. The second stage membrane apparatus 38 also produces a stage 2 permeate mixture 39 further enriched in the desired gas or gases. The stage 2 permeate mixture 39 is recompressed or further compressed by compressor 41 and passed to stage 3 membrane separation apparatus 42. From the third stage membrane separation apparatus 42 there are recovered a still further enriched permeate mixture 43 and a third stage permeant mixture 44, still at substantially the inlet pressure of the feed to stage 3 apparatus 42, which is passed to the stage 4 or recycle stage membrane separation apparatus 45. The recycle stage membrane separation apparatus 45 is sized so as to produce a recycle stage permeant mixture 47 of approximately the same gaseous composition as the compressed feed to stage 2 membrane separation apparatus 38 and suitable for blending with such feed at a point 49 just prior to the inlet of the stage 2 membrane separation apparatus 38. There is simultaneously produced a recycle stage permeate mixture 46 enriched in the desired gas or gases and suitable for blending with the permeate mixture 39 from the stage 2 membrane separation apparatus 38 and which is blended with said permeate mixture 39 at a point 48 just prior to the compressor 41.

This multi-stage cascade gas separation process illustrated in FIG. 3 likewise results in improved efficiencies in gas separation and generally the same advantages set forth hereinabove with respect to the two stage gas separation process. For example it has been found by computer simulated studies that the three stage cascade and recycle gas separation process as shown in FIG. 3 when applied to the concentration of oxygen from an air feed can raise the concentration of oxygen in the third stage permeate mixture product 43, at the same weight of gas product per hour, from 94.5% by volume oxygen to 96.6% by volume with no increase in the horsepower required for the three stages of compression when compared to a three stage cascade membrane separation process employing three stages in series of membrane separation apparatus with the same hollow fiber membranes and pressure differentials but with no recycle stage. In the instance of the specific oxygen separation membrane studied the three stage plus recycle stage cascade process required an increased surface area for the four items of separation membrane apparatus in the process of FIG. 3 in comparison to that of the three items of separation membrane apparatus utilized in a three stage series cascade due to sizing of the membrane surface areas required to produce a recycle stage permeant mixture 47 approximating the composition of the first stage permeate mixture 34 and a second stage permeant mixture 40 approximating the composition of the feed mixture 31.

The method for separating gaseous mixtures of the present invention is applicable to the separation, concentration or purification of any gas or gases from any other gases or vapors which can be separated by semi-permeable membranes by virtue of selective permeation or diffusion therethrough of one or more gas or gases from gaseous mixtures. Such separations can include oxygen or nitrogen from air, water vapor from any mixture of gases, hydrogen from any of carbon monoxide, carbon dioxide, helium, nitrogen, argon, ammonia, alkanes such as methane, ethane and the like, and alkenes such as ethylene, propylene and the like, ammonia from hydrogen, nitrogen, argon, water vapor, alkanes and the like, carbon monoxide from carbon dioxide, hydrogen, nitrogen, argon, alkanes and the like, carbon dioxide from hydrogen, nitrogen, carbon monoxide, alkanes and the like, hydrogen sulfide from hydrogen, nitrogen, carbon dioxide, alkanes and the like, alkanes such as methane from hydrogen, nitrogen, ammonia, carbon monoxide, carbon dioxide, methanol, water vapor and the like, alkanols such as methanol or ethanol from hydrogen, carbon monoxide, carbon dioxide, nitrogen, alkanes such as methane or ethane and the like and any other gases or vapors separable by contacting a semi-permeable membrane such as isotopes of vaporizable metal such as uranium hexafluoride and the like.

The semi-permeable membranes which can be employed in the novel process of the present invention can be of any type useful for separating gases. Such membranes can be in the form of films, asymmetric or symmetric, supported or self-supporting, rolled into tubular or spiral form or employed flat. The gas separation membranes are preferably in the form of hollow fibers in order to realize the greatest surface areas in the most economically sized apparatus. Such hollow fiber membranes can likewise be either symmetric or asymmetric, isotropic or anisotropic, and can be homogenous insofar as their composition. They can be hollow fibers of one material coated on either or both the exterior or interior thereof with one or more other materials, i.e. composite or multicomponent hollow fiber membranes. In the case of many gas separations such composite or multicomponent membranes have been found to exhibit very superior selectivities for the desired gases and high permeabilities for such gases and hence are often preferred to realize efficient separations processes. In fact, any hollow fiber gas separation membranes are preferably employed in the novel process of the present invention so long as such hollow fiber membranes are effective to separate one or more gases from a mixture of gases such as any of those described above.

The gas separation membrane apparatus which can be employed in the present invention is likewise not limiting. Any apparatus suitable for holding and providing contact on one surface of a membrane in film form together with provision for inlet of a feed gas mixture and outlet of an unpermeated permeant mixture and a selectively permeated permeate mixture can be used. In the instance of the preferred hollow fiber membranes the apparatus can be of any form which provides for an assembly of hollow fiber membranes manifolded to provide separate contact to the exterior of the fibers for a gaseous feed mixture and removal of an unpermeated permeant mixture as well as removal of a permeate mixture from the interior or bores thereof, or alternatively for the feed mixture to the interior and removal of the unpermeated permeant mixture therefrom as well as removal of the permeate mixture from the exterior of the fibers. The apparatus need provide an outer housing, inlet means manifolded to either the exterior or interior of said fibers, and exit means manifolded from both the exterior and interior of said fibers. Such apparatus can be of the straight through type wherein the fibers are manifolded at both ends of the housing of the apparatus, the type with U-shaped fiber filling wherein the manifolding is at one end only of the housing or shell of the apparatus, or of any other configuration providing for effective separation by permeation of one or more gases or vapors from a mixture of gases or vapors.

The other items of equipment or apparatus illustrated diagramatically in the drawing such as compressors, expanders and conduits between the various stages are of conventional design and any convenient type of such apparatus can be employed and forms no part of the present invention.

While the invention has been described with reference to particular embodiments thereof, it will be appreciated that modifications and variations are possible without departing from the scope of the invention.

What is claimed:

1. The method of separating gaseous mixtures characterized by
   (a) providing a pressurized initial gaseous mixture at superatmospheric pressure and contacting therewith a first stage membrane permeable to at least one of the gases in said mixture to provide an enriched first permeate mixture and a depleted first permeant mixture,
   (b) compressing said enriched first permeate mixture and contacting therewith a second stage membrane permeable to said at least one of the gases in said first permeate mixture to provide a further enriched second permeate mixture and a depleted second permeant mixture,
   (c) directing said depleted second permeant mixture, with no increase in pressure, into contact with a separate recycle stage membrane permeable to said at least one of the gases in said second permeant mixture to produce an enriched recycle permeate mixture and a depleted recycle permeant mixture,
   (d) blending said enriched recycle permeate mixture with said enriched first permeate mixture prior to the compression thereof,
   (e) blending said recycle permeant mixture with said pressurized initial gaseous mixture, and
   (f) recovering said enriched second permeate mixture.

2. The method of claim 1 characterized in that said depleted first permeant mixture is removed to disposal.

3. The method of claim 2 characterized in that said depleted first permeant mixture is expanded to a reduced pressure and power recovered therefrom.

4. The method of claim 1 characterized in that said recycle stage membrane is sized so as to produce a said enriched recycle permeate mixture of approximately the same composition of gases as said enriched first permeate mixture.

5. The method of claim 1 characterized in that said recycle stage membrane is sized so as to produce a depleted recycle permeant mixture of approximately the same composition of gases as said initial gaseous mixture.

6. The method of claim 1 characterized in that the said membranes permeable to said at least one gas are hollow fiber membranes.

7. The method of claim 1 characterized in that the said membranes permeable to said at least one gas are multicomponent hollow fiber membranes.

8. The method of claim 1 characterized in that said enriched second permeate mixture is subjected to additional stages of compression and separation prior to recovery thereof.

9. The method of claim 1 characterized in that said gaseous mixture comprises at least one gas and at least one other gas or vapor, and said at least one gas is separable from said at least one other gas or vapor by selective permeation through a semi-permeable membrane.

10. The method for separating gaseous mixtures characterized by
    (a) subjecting a gaseous mixture to plural stages of contact at superatmospheric pressure with membranes permeable to at least one of the gases in said mixture to provide from a second or later stage of membrane separation a permeate mixture enriched in said at least one gas and a permeant mixture depleted in said at least one gas,
    (b) directing said permeant mixture from a second or later stage of membrane separation, with no increase in pressure, into contact with a separate recycle stage membrane permeable to said at least one gas to produce a recycle permeate mixture enriched in said at least one gas and a recycle permeant mixture depleted in said at least one gas,
    (c) blending said recycle permeate mixture with the permeate mixture from a preceding stage of membrane separation,
    (d) blending said recylce permeant mixture with the pressurized gaseous mixture fed to a preceding stage of membrane separation, and
    (e) subjecting said permeate mixture from said second or later stage of membrane separation to additional stages of compression and separation or to recovery thereof.

11. The method for separating gaseous mixtures characterized by
    (a) subjecting a gaseous mixture to plural stages of contact at superatmospheric pressure with membranes permeable to at least one of the gases in said mixture to provide a penultimate permeate mixture enriched in said at least one gas and a penultimate permeant mixture depleted in said at least one gas,
    (b) compressing said enriched penultimate permeate mixture and contacting therewith a final stage membrane permeable to said at least one gas in said penultimate permeate mixture to provide a final stage permeate mixture further enriched in said at least one gas and a final stage permeant gas mixture depleted in said at least one gas,
    (c) directing said final stage permeant mixture, with no increase in pressure, into contact with a separate recycle stage membrane permeable to said at least one gas to produce a recycle permeate mixture enriched in said at least one gas and a recycle permeant mixture further depleted in said at least one gas,
    (d) blending said recycle permeate mixture with said penultimate permeate mixture prior to the compression thereof,
    (e) blending said recycle permeant mixture with the pressurized gaseous mixture fed to the penultimate stage membrane, and
    (f) recovering said final stage permeate mixture.

12. The method of claim 11 characterized in that said gaseous mixture comprises at least one gas and at least one other gas or vapor, and said at least one gas is separable from said at least one other gas or vapor by selective permeation through a semi-permeable membrane.

13. The method of claim 11 characterized in that said recycle stage membrane is sized so as to produce a said recycle permeate mixture of approximately the same composition of gases as said penultimate permeate mixture.

14. The method of claim 11 characterized in that said recycle stage membrane is sized so as to produce a said recycle permeant mixture of approximately the same composition of gases as said gaseous mixture fed to said penultimate stage membrane.

15. The method of claim 11 characterized in that said penultimate permeant mixture from (a) is blended with the gaseous mixture fed to a preceding stage membrane.

16. The method of claim 15 characterized in that said penultimate stage membrane is sized so as to produce said penultimate permeant mixture of approximately the same composition of gases as said gaseous mixture fed to said preceding stage membrane.

17. The method of claim 11 characterized in that said membranes permeable to said at least one gas are hollow fiber membranes.

18. The method of claim 11 characterized in that said membranes permeable to said at least one gas are multicomponent hollow fiber membranes.

19. The method of claim 11 characterized in that a permeant mixture from a stage of separation previous to said penultimate stage is expanded to a reduced pressure and power recovered therefrom.

20. The method of claim 10 characterized in that said gaseous mixture comprises at least one gas and at least one other gas or vapor, and said at least one gas is separable from said at least one other gas or vapor by selective permeation through a semi-permeable membrane.

* * * * *